(12) United States Patent
Nogiwa

(10) Patent No.: US 7,280,690 B2
(45) Date of Patent: Oct. 9, 2007

(54) GRADATION CORRECTION CURVE CREATION METHOD, GRADATION CORRECTION CURVE CREATION APPARATUS, AND GRADATION CORRECTION CURVE CREATION PROGRAM STORAGE MEDIUM

(75) Inventor: Masaki Nogiwa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 776 days.

(21) Appl. No.: 10/777,124

(22) Filed: Feb. 13, 2004

(65) Prior Publication Data

US 2004/0160618 A1 Aug. 19, 2004

(30) Foreign Application Priority Data

Feb. 14, 2003 (JP) ............................. 2003-036840

(51) Int. Cl.
*G06K 9/00* (2006.01)
(52) U.S. Cl. ...................... 382/167; 382/162; 382/274
(58) Field of Classification Search ................ 382/167, 382/162, 168, 169, 274; 358/1.9, 2.1, 521, 358/3.01, 406, 504, 518
See application file for complete search history.

(56) References Cited

U.S. PATENT DOCUMENTS 6,388,768 B2 * 5/2002 Hada et al. ................. 358/1.9
6,952,288 B2 * 10/2005 Yamada et al. .............. 358/1.9

FOREIGN PATENT DOCUMENTS

| JP | 2001-245171 A | 9/2001 |
|----|---------------|--------|
| JP | 2002-262122 | 9/2002 |

\* cited by examiner

*Primary Examiner*—Ahn Hong Do
(74) *Attorney, Agent, or Firm*—Sughrue Mion Pllc.

(57) ABSTRACT

A gradation correction curve creation apparatus for creating gradation correction curves for improving color reproducibility in UCR process includes a first gradation correction curve creation section creating a first gradation correction curve based on measured density values and target density values of monochromatic patches, a second gradation correction curve creation section creating a second gradation correction curve based on measured calorimetric values and target calorimetric values of gray patches, a start position calculation section calculating start positions on the first and second gradation correction curves at which the gray component in color mixture starts replacement with K through UCR process, and a gradation correction curve combining section creating a third gradation correction curve by smoothly connecting the more shadowed side of the first gradation correction curve than the start position and the more highlighted side of the second gradation correction curve than the start position.

4 Claims, 10 Drawing Sheets

GRADATION CORRECTION CURVE CREATION METHOD, GRADATION CORRECTION CURVE CREATION APPARATUS, AND GRADATION CORRECTION CURVE CREATION PROGRAM STORAGE MEDIUM

BACKGROUND OF THE INVENTION

1. Field of the Invention

The present invention relates to a gradation correction curve creation method for creating gradation correction curves used to correct the gradation of images, a gradation correction curve creation apparatus, and a gradation correction curve creation program storage medium containing a gradation correction curve creation program which makes a computer operate as a gradation correction curve creation apparatus.

2. Description of the Related Art

Conventionally, to create a desired image with desired colors, image data of the image is sent to an image output device which will output the image, after performing a color conversion process on the image data according to image output characteristics of the image output device and performing a gradation correction process on the image data to correct its color gradation. In the gradation correction process, a gradation correction curve is defined beforehand in an LUT (lookup table) or the like for each of C (cyan), M (magenta), Y (yellow), and K (black) colors, for example, and image data for the CMYK colors are converted based on the respective gradation correction curves.

Procedures for creating the gradation correction curves involves creating image data which represents a color chart consisting of density patches for each of the C, M, Y, and K colors on a personal computer or the like, sending the image data to the image output device to output the color chart, and measuring the densities of the C, M, Y, and K density patches composing the outputted color chart. By associating the measured densities of the density patches with the values of the image data used to generate the respective density patches, it is possible to create gradation correction curves.

Although gradation correction curves can basically be created as described above, since the gradation correction curves created in this way allow for only the axial directions of the C, M, Y, and K colors, the curves are not adjusted properly in the direction of gray consisting of a mixture of three colors C, M, and Y. Thus, conventional practice involves printing out image data which represent density patches of gray consisting of a mixture of the C, M, and Y colors after making gradation corrections using temporary gradation correction curves created in the manner described above; checking the tint of the density patches of gray visually; fine-adjusting the gradation correction curves; judging whether the gradations of the plain colors C, M, and Y as well as the tint of gray are within tolerances; repeating fine adjustments so that both the gradations and the tint of gray are within the tolerances; and thereby obtaining final gradation correction curves. In this case, fine adjustments are repeated a number of times, expending a great deal of time and effort until finally high-accuracy gradation correction curves are obtained. Besides, considerable experience is required to fine-adjust gradation correction curves properly.

To solve this problem, Japanese Patent Laid-Open No. 2001-245171 discloses a gradation correction curve creation method which determines first gradation correction curves by measuring the densities of density patches of plain colors C, M, and Y, determines second gradation correction curves for each of the C, M, and Y colors by measuring density patches of gray consisting of a mixture of C, M, and Y, internally divides the first gradation correction curves and second gradation correction curves with a predetermined weights assigned, and thereby determines gradation correction curves of the C, M, and Y colors. This method makes it easy to create gradation correction curves without special skills gained by experience.

Regarding the image output device described above, printing machines and ink jet printers as well as electrophotographic printers widely used recently express all colors by superimposing C, M, Y, and K inks or toners. Although three colors C, M, and Y alone should essentially be able to express all colors, the mixture of these three colors cannot provide a sufficiently intense black, and thus K is used to express deep black especially in shadows. K is used widely not only to express deep black, but also to apply a technique known as UCR (Under Color Removal). The UCR is a technique for reducing the total amount of ink or toner by replacing the gray component expressed by three colors C, M, and Y with K. Usually, for example, a color originally expressed by dot area percentage (C, M, Y, K)=(70%, 80%, 90%, 0%) is expressed by dot area percentage (C, M, Y, K)=(0%, 10%, 20%, 70%) as a result of UCR which replaces 70% each of equivalent amounts of the C, M, and Y components of this color with 70% of an equivalent amount of K. Whereas the amount of all the inks added to express this color is 240% in terms of the dot area percentage before the UCR, this amount is reduced to 100% in terms of the dot area percentage after the UCR. In particular, toner is used for electrophotographic printers, and if a number of toners are superimposed at one location, the toners may clog resulting in a printer failure or toners piled up thickly on paper may come off resulting in peeling of films. These problems can be avoided by limiting the total amount of superimposed toners or inks using UCR.

When the total amount of inks is limited using the UCR process, gray consisting of a mixture of C, M, and Y is replaced by K beginning at some point, and thus that part of gradation which has been replaced by K cannot be controlled as gray consisting of a mixture of C, M, and Y. Consequently, the use of gradation correction curves created by the method disclosed in Japanese Patent Laid-Open No. 2001-245171 lowers the reproducibility of colors especially in the shadows where most of the gray component in the color mixture is replaced by K.

In view of the above circumstances, the object of the present invention is to provide a gradation correction curve creation method for creating gradation correction curves which can improve the reproducibility of colors even when a UCR process is performed, a gradation correction curve creation apparatus, and a gradation correction curve creation program storage medium containing a gradation correction curve creation program which makes a computer operate as a gradation correction curve creation apparatus.

SUMMARY OF THE INVENTION

The present invention provides a gradation correction curve creation method for creating gradation correction curves which define gradation correction of an image, including:

a patch output step of outputting, from an image output device, plural monochromatic patches which are of a predetermined plain color and differ from one another in density and plural gray patches which are of gray consisting of a mixture of plain colors and differ from one another in density;

a first measuring step of measuring a color-related first physical quantity of the plural monochromatic patches outputted from the patch output step and obtaining first measured values;

a second measuring step of measuring a color-related second physical quantity of the plural gray patches outputted from the patch output step and obtaining second measured values;

a first gradation correction curve creation step of creating a first gradation correction curve based on the first measured values obtained in the first measuring step and on first target values which represent color targets for the monochromatic patches;

a second gradation correction curve creation step of creating a second gradation correction curve based on the second measured values obtained in the second measuring step and on second target values which represent color targets for the gray patches;

a start position calculation step of calculating positions on the first and second gradation correction curves at which a gray component in a color mixture of plain colors starts to be replaced with monochrome black through an under-color removal process; and a gradation correction curve combining step of combining the more shadowed side of the first gradation correction curve created in the first gradation correction curve creation step than the position calculated in the start position calculation step and the more highlighted side of the second gradation correction curve created in the second gradation correction curve creation step than the position calculated in the start position calculation step, and thereby creating a continuous third gradation correction curve.

When an under-color removal process (UCR process) is performed to replace the gray component in color mixture with monochrome black, that part of gradation which is replaced by black cannot be controlled completely even if the tint of the gray component is adjusted. Thus, if a gradation correction process is performed based on a gradation correction curve for a gray which consists of a color mixture, the reproducibility of colors is lowered.

The gradation correction curve creation method according to the present invention creates a continuous third gradation correction curve by using the second gradation correction curve for gray consisting of a color mixture for that part of gradation which is not replaced by black in the under-color removal process and using the first gradation correction curve for that part of gradation which is replaced by black. By performing the gradation correction process based on the third gradation correction curve created in this way, it is possible to improve the reproducibility of colors especially on the shadowed side where most of the gray component in the color mixture is replaced by K.

In the gradation correction curve creation method of the present invention, preferably the first physical quantity is density and second physical quantity is calorimetric values.

When configured in this way, the gradation correction curve creation method of the present invention can easily obtain density values which are the first measured values by measuring, the density, i.e., the first physical quantity, of monochromatic patches as well as second target values which represent targets for the calorimetric values, i.e., the second physical quantity, of the gray patches consisting of color mixture.

Also, the present invention provides a gradation correction curve creation apparatus that creates a gradation correction curve which defines gradation correction of an image, including:

a first gradation correction curve creation section which creates a first gradation correction curve based on first measured values obtained by measuring a color-related first physical quantity of plural monochromatic patches which are of a predetermined plain color and differ from one another in density as well as on first target values which represent color targets for the monochromatic patches, plural monochromatic patches having been output from an image output device;

a second gradation correction curve creation section which creates a second gradation correction curve based on second measured values obtained by measuring a color-related second physical quantity of plural gray patches which are of gray consisting of a mixture of plain colors and differ from one another in density as well as on second target values which represent color targets for the gray patches, plural gray patches having been output from the image output device;

a start position calculation section which calculates positions on the first and second gradation correction curves at which a gray component in a color mixture of plain colors starts to be replaced with monochrome black through an under-color removal process; and a gradation correction curve combining section which combines the more shadowed side of the first gradation correction curve created by the first gradation correction curve creation section than the position calculated by the start position calculation section and the more highlighted side of the second gradation correction curve created by the second gradation correction curve creation section than the position calculated by the start position calculation section, and thereby creates a continuous third gradation correction curve.

The gradation correction curve creation apparatus of the present invention combines the second gradation correction curve created by the second gradation correction curve creation section and the first gradation correction curve created by the first gradation correction curve creation section into a continuous third gradation correction curve, using the second gradation correction curve on the more highlighted side and the first gradation correction curve on the more shadowed side than the part where replacement with black begins in the under-color removal process. By performing the gradation correction process based on the third gradation correction curve created in this way, it is possible to improve the reproducibility of colors on the more shadowed side than the part where replacement with black begins.

Also, the present invention provides a gradation correction curve creation program storage medium containing a gradation correction curve creation program that runs on a computer and makes the computer create gradation correction curves which define gradation correction of an image, wherein the gradation correction curve creation program includes:

a first gradation correction curve creation section which creates a first gradation correction curve based on first measured values obtained by measuring a color-related first physical quantity of plural monochromatic patches which are of a predetermined plain color and differ from one another in density as well as on first target values which represent color targets for the monochromatic patches, plural monochromatic patches having been output from an image output device;

a second gradation correction curve creation section which creates a second gradation correction curve based on second measured values obtained by measuring a color-related second physical quantity of plural gray patches which are of gray consisting of a mixture of plain colors and differ from one another in density as well as on second target values which represent color targets for the gray patches, plural gray patches having been output from the image output device;

a start position calculation section which calculates positions on the first and second gradation correction curves at which a gray component in a color mixture of plain colors starts to be replaced with monochrome black through an under-color removal process; and a gradation correction curve combining section which combines the more shadowed side of the first gradation correction curve created by the first gradation correction curve creation section than the position calculated by the start position calculation section and the more highlighted side of the second gradation correction curve created by the second gradation correction curve creation section than the position calculated by the start position calculation section, and thereby creates a continuous third gradation correction curve.

By running the gradation correction curve creation program contained in the gradation correction curve creation program storage medium of the present invention on a computer, it is possible to make the computer operate as a gradation correction curve creation apparatus.

As described above, this embodiment can improve the reproducibility of colors even when a UCR process is carried out.

DETAILED DESCRIPTION OF THE PREFERRED EMBODIMENTS

An embodiment of the present invention will be described below.

Figure 1:
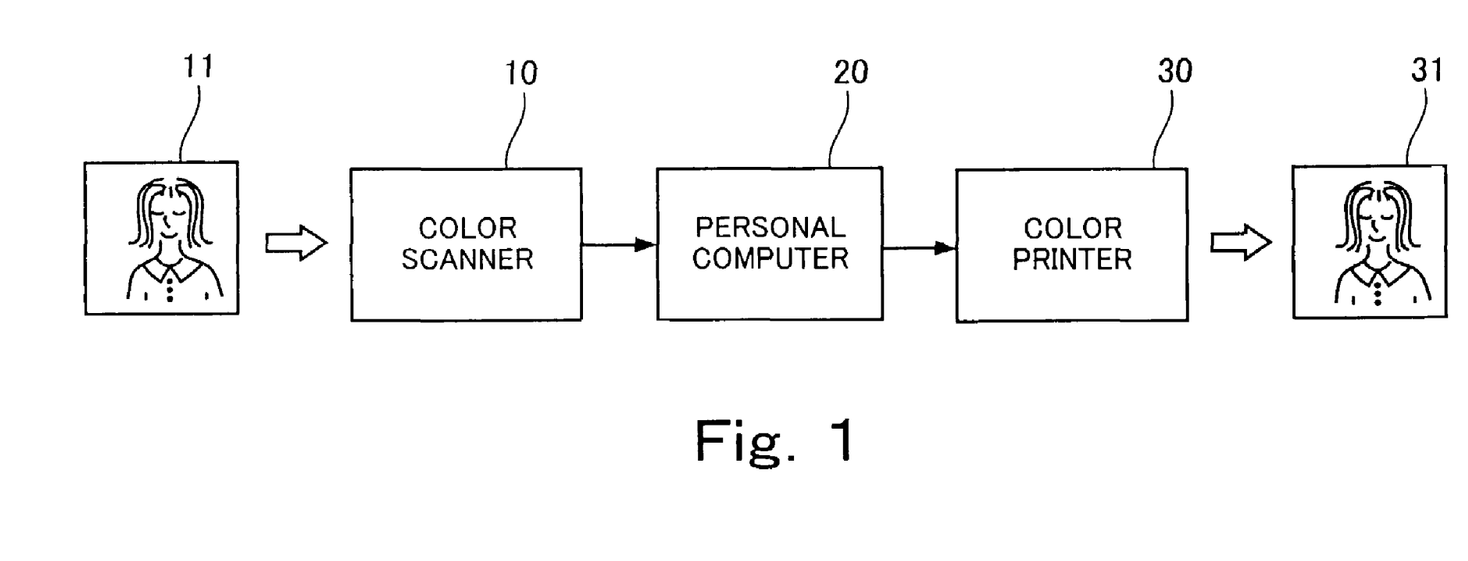
FIG. 1 is a general block diagram of an image processing system to which an embodiment of the present invention is applied.

FIG. 1 is a general block diagram of an image processing system to which an embodiment of the present invention is applied.

The figure shows a color scanner 10, which reads an original image 11 and generates image data consisting of four colors C, M, Y, and K. The CMYK image data is fed to a personal computer 20, which converts the image data captured by the color scanner 10 into image data for image output compatible with a color printer 30 described later. Now, interrupting the description of FIG. 1, functions of the personal computer 20 will be described with reference to FIG. 2.

Figure 2:
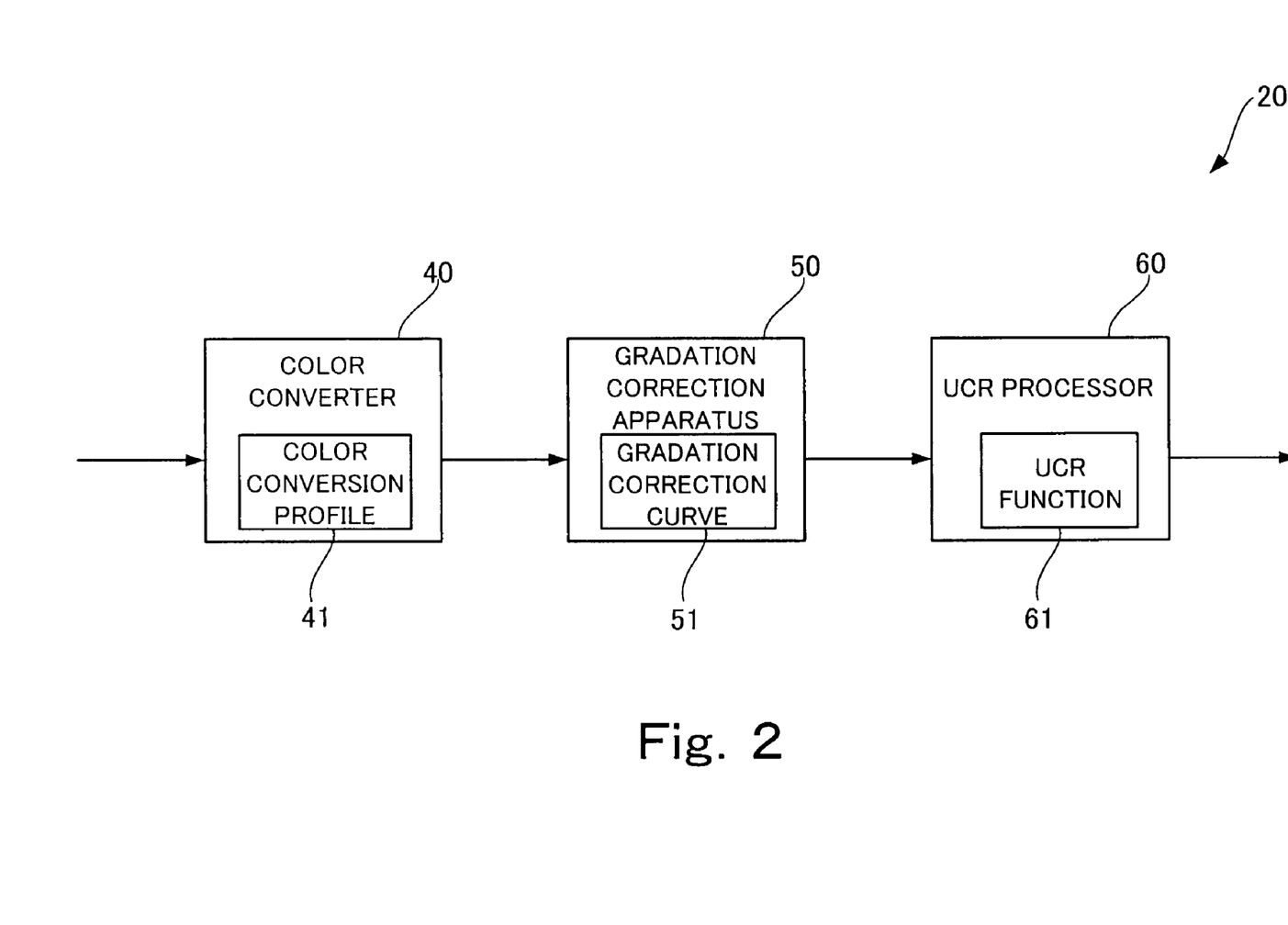
FIG. 2 is a functional block diagram of the personal computer shown in FIG. 1.

FIG. 2 is a functional block diagram of the personal computer 20.

The personal computer 20 shown in FIG. 1 is equipped with functions provided respectively by a color converter 40, gradation correction apparatus 50, and UCR processor 60.

The personal computer 20 contains color conversion profiles 41 in the form of color lookup tables defining correspondence between image data in color spaces compatible with the color scanner 10 in FIG. 1 and image data in color spaces compatible with the a color printer 30. The color converter 40 converts image data received from the color scanner 10 shown in FIG. 1 into image data compatible with the color printer 30 by referring to the color conversion profiles 41. The resulting image data is sent to the gradation correction apparatus 50, which then performs a gradation correction process on the image data received from the color converter 40, according to gradation correction curves 51 described later. If the image data subjected to a gradation correction process by the gradation correction apparatus 50 were output directly to the color printer 30 shown in FIG. 1, ink might peel off in some part of the image printed out by the color printer 30 because a great deal of ink was superimposed. To avoid this situation, the image data subjected to the gradation correction process is sent to the UCR processor 60. The UCR processor 60 performs a UCR process on the image data received from the gradation correction apparatus 50, based on a UCR function 61 prepared in advance. The UCR process lowers the maximum output values of each of the CMY colors by replacing the gray component in the image produced from the image data with K. The UCR processor 60 adjusts the amounts of ink to be superimposed in the printout from the color printer 30, and then the adjusted image data is sent to the color printer 30 shown in FIG. 1.

This finishes the description of FIG. 2 and the description of FIG. 1 will be resumed.

The image data fed from the color scanner 10 to the personal computer 20 is sent to the color printer 30 after being converted into image data for image output compatible with a color printer 30. The color printer 30 produces printouts based on the received image data to form printed images 31.

In the image processing system shown in FIG. 1, the color printer 30 is shown as an example of the image output device which outputs images based on image data, and the color printer 30 may be of any type, such as an electrophotographic color printer or ink jet color printer, regardless of the printing method. Also, the image output device is not limited to printers, and may be another printing machine. However, description will be given here citing an image processing system equipped with the color printer 30 as an example of the image output device.

As an embodiment of the present invention, the image processing system shown in FIG. 1 is characterized by processes executed in the personal computer 20, and a description of the personal computer 20 follows.

Figure 3:
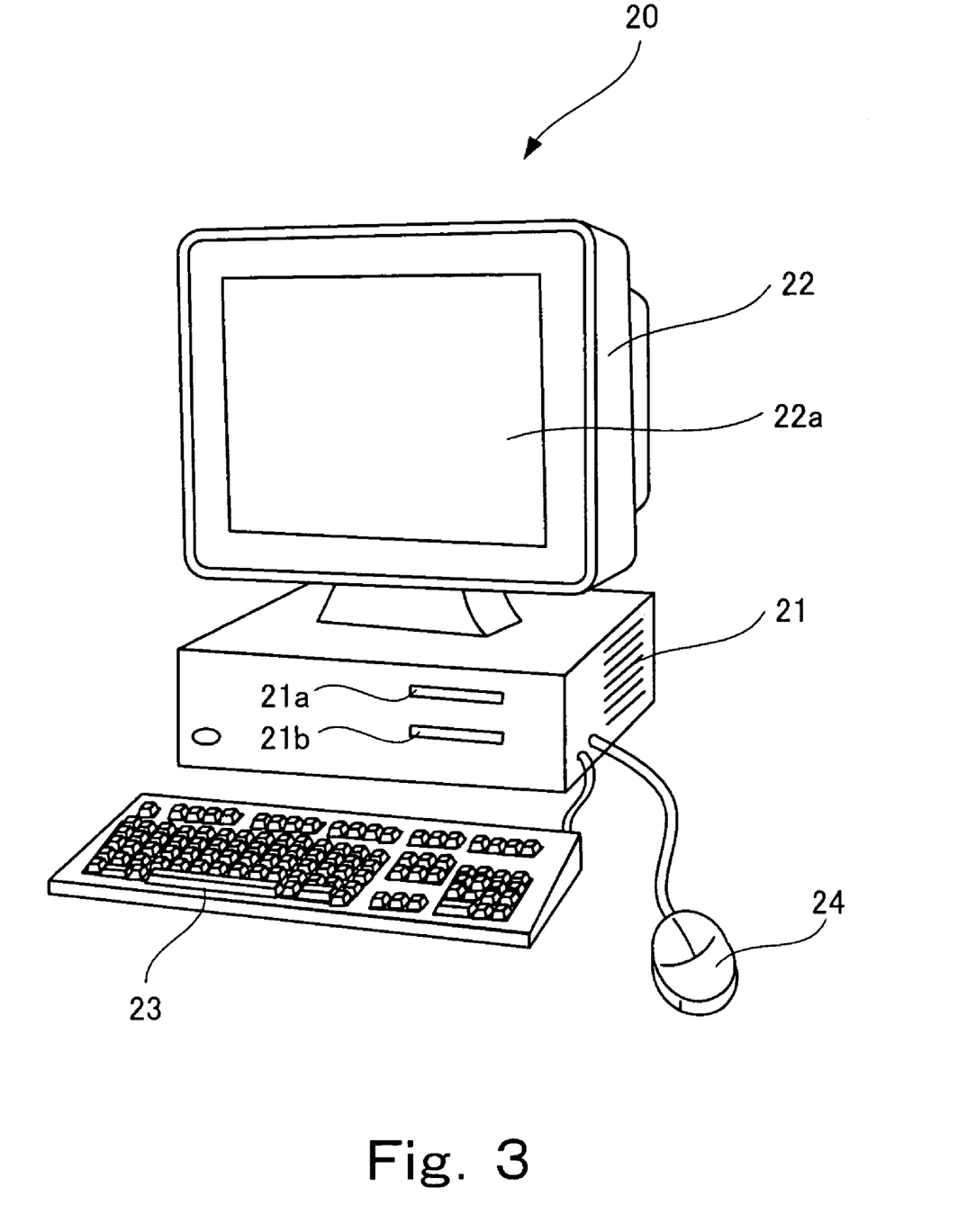
FIG. 3 is an external perspective view of the personal computer.
Figure 4:
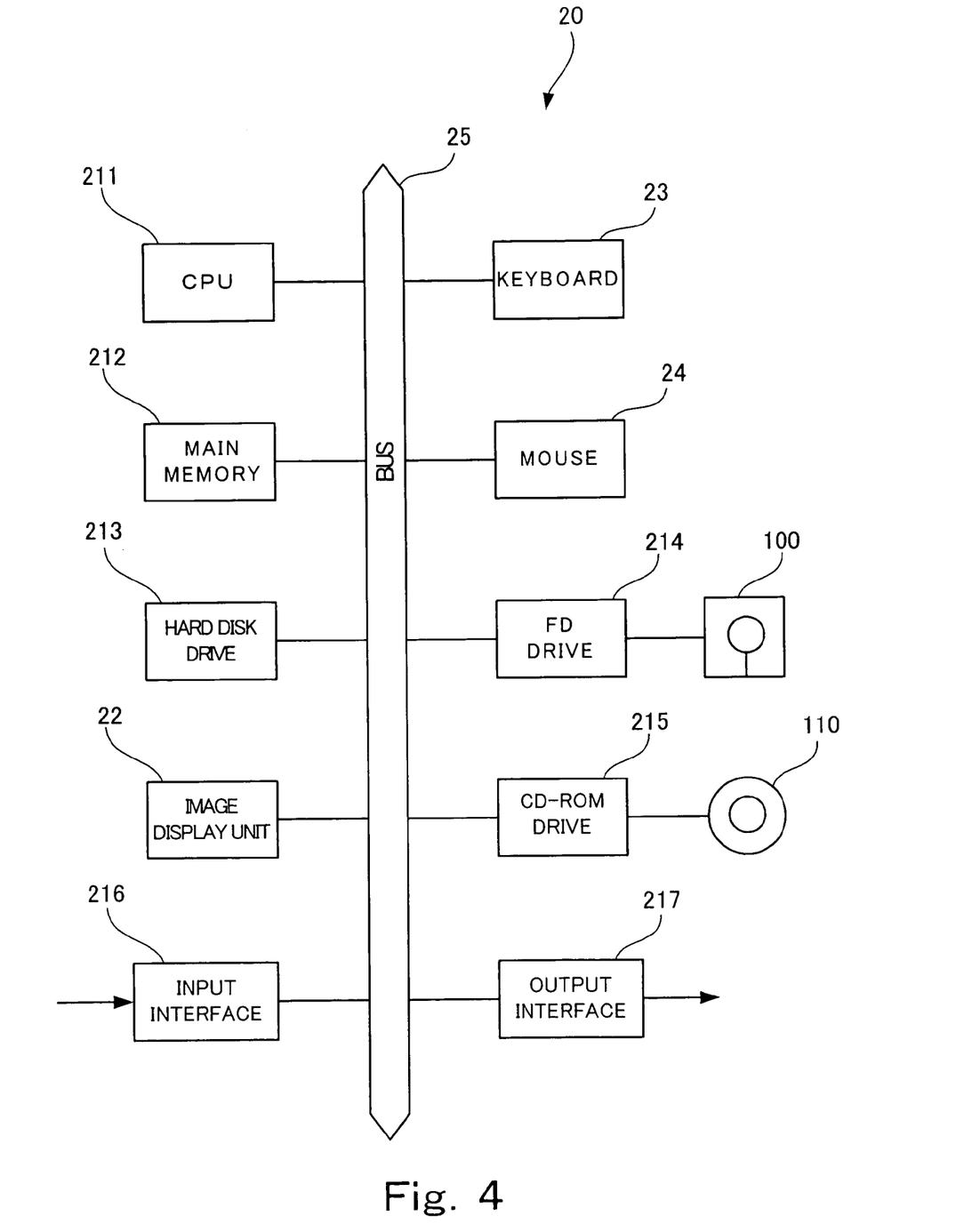
FIG. 4 is a hardware block diagram of the personal computer.

FIG. 3 is an external perspective view of the personal computer 20 shown by one block in FIG. 1 while FIG. 4 is a hardware block diagram of the personal computer 20.

In terms of external configuration, the personal computer 20 has a main unit 21, image display unit 22 which displays images on a display screen 22*a* according to instructions from the main unit 21, keyboard 23 used to enter various information in the main unit 21 by keystrokes, and mouse 24 used to point to a desired position on the display screen 22*a* to enter an instruction corresponding to an object such as an icon displayed at that position. In appearance, the main unit 21 has an FD slot 21*a* in which a flexible disk (hereinafter abbreviated to an FD) is mounted and CD-ROM slot 21*b* in which a CD-ROM is inserted.

As shown in FIG. 4, the main unit 21 contains a CPU 211 which executes various programs; a main memory 212 in which programs are loaded from a hard disk drive 213 for the CPU 211 to execute; the hard disk drive 213 which stores various programs, data, etc.; an FD drive 214 which accesses an FD 100 mounted in it; a CD-ROM drive 215 which accesses a CD-ROM 110 mounted in it; an input interface 216 which receives image data from the color scanner 10 (FIG. 1) connected to it; and an output interface 217 which sends the image data to the color printer 30. These components as well as the image display unit 22, keyboard 23, and mouse 24 shown also in FIG. 3 are interconnected via a bus 25.

Here, the CD-ROM 110, which is an embodiment of the gradation correction curve creation program storage medium according to the present invention, stores a gradation correction curve creation program which makes the personal computer 20 operate as an embodiment of the gradation correction curve creation apparatus according to the present invention. As the CD-ROM 110 is mounted on the CD-ROM drive 215, the gradation correction curve creation program is uploaded from the CD-ROM 110 to the personal computer 20 and stored on the hard disk drive 213. Then, as the gradation correction curve creation program is started and executed, the personal computer 20 shown in FIG. 2 operates as an embodiment of the gradation correction curve creation apparatus according to the present invention.

Next, description will be given of the gradation correction curve creation program executed in the personal computer 20.

Figure 5:
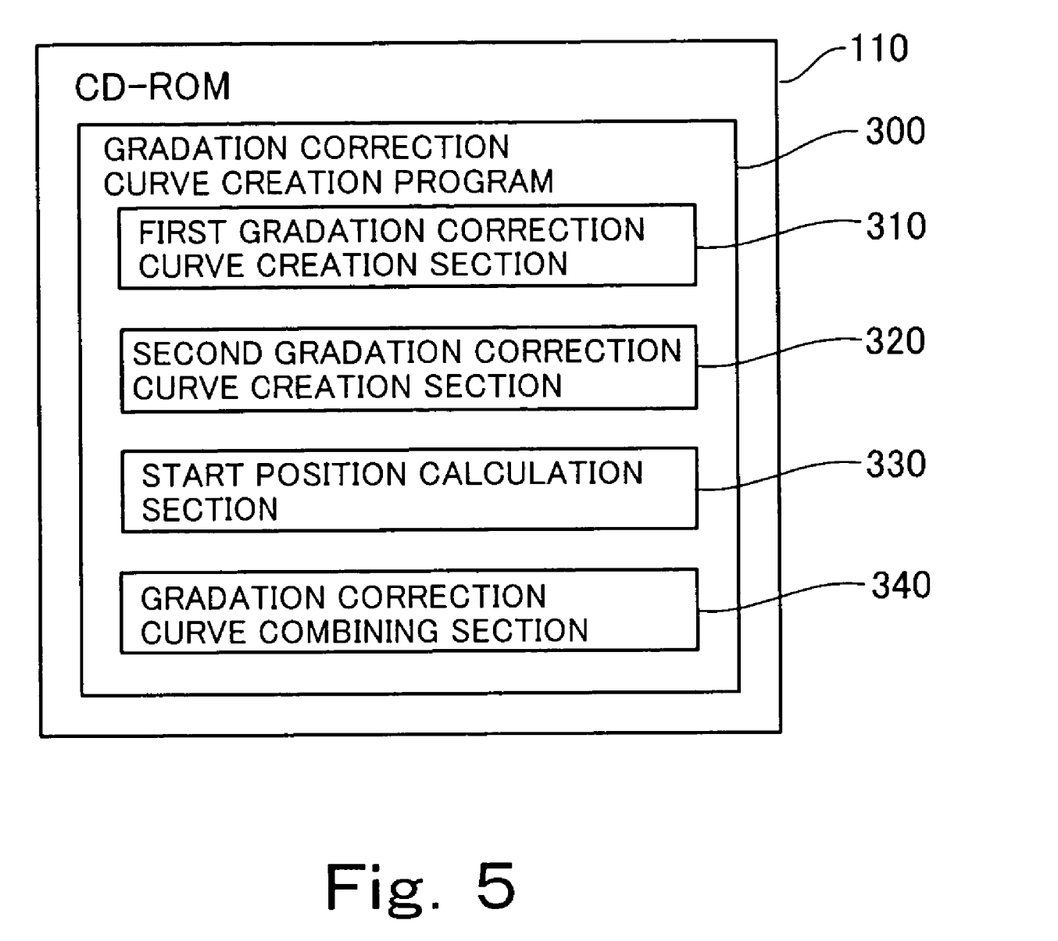
FIG. 5 is a conceptual diagram showing a CD-ROM which is an embodiment of a gradation correction curve creation program storage medium according to the present invention.

FIG. 5 is a conceptual diagram showing the CD-ROM 110 which is an embodiment of the gradation correction curve creation program storage medium according to the present invention.

The gradation correction curve creation program 300 consists of a first gradation correction curve creation section 310, second gradation correction curve creation section 320, start position calculation section 330, and gradation correction curve combining section 340. Here, the first gradation correction curve creation section 310 is an example of the first gradation correction curve creation section in the gradation correction curve creation program according to the present invention, the second gradation correction curve creation section 320 is an example of the second gradation correction curve creation section in the gradation correction curve creation program according to the present invention, the start position calculation section 330 is an example of the start position calculation section in the gradation correction curve creation program according to the present invention, and the gradation correction curve combining section 340 is an example of the gradation correction curve combining section in the gradation correction curve creation program according to the present invention. Details of the components of the gradation correction curve creation program 300 will be described together with operation of components of a gradation correction curve creation apparatus 400 (FIG. 6) which is an embodiment of the gradation correction curve creation apparatus according to the present invention.

Figure 6:
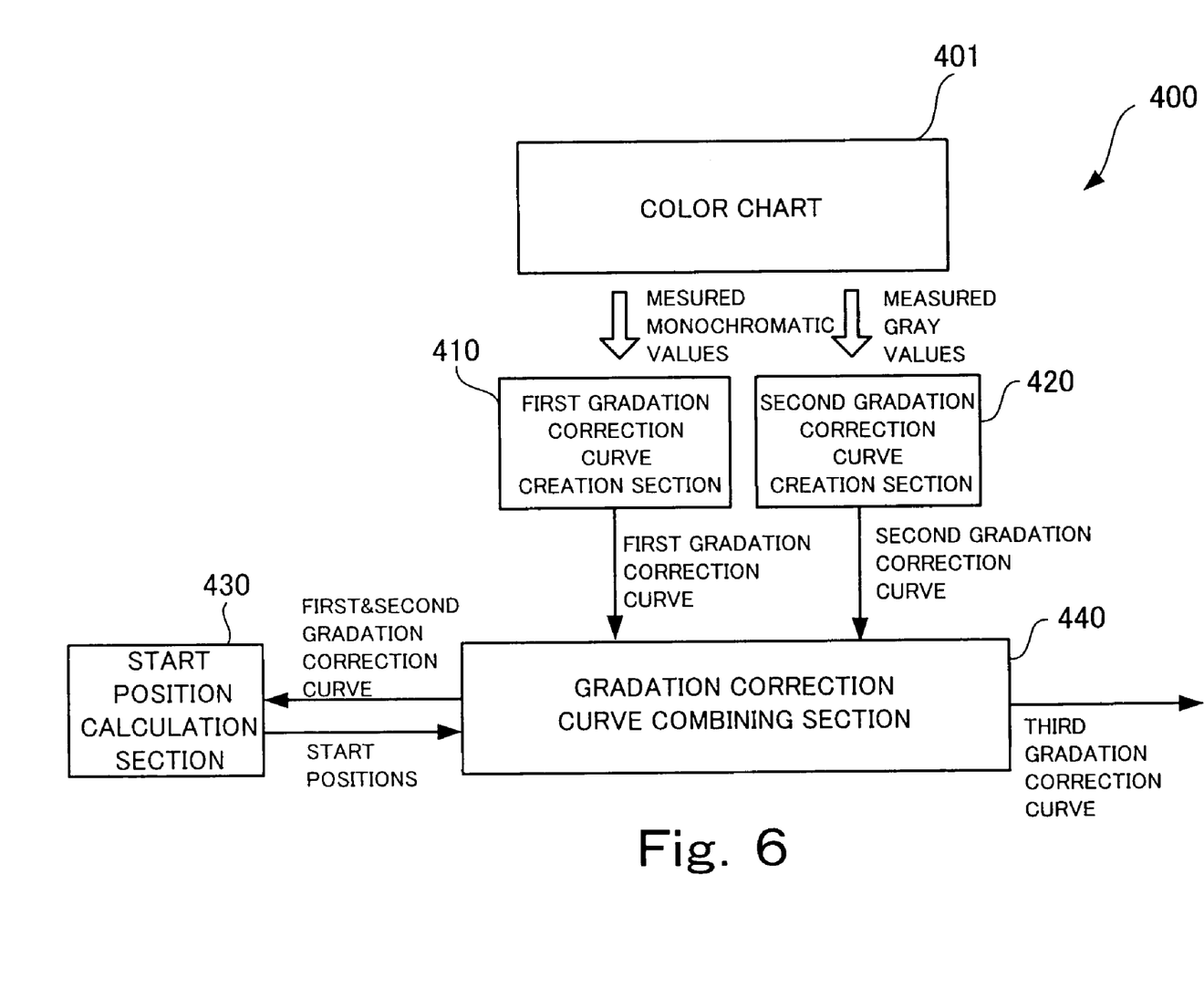
FIG. 6 is a functional block diagram of a gradation correction curve creation apparatus which is an embodiment of the gradation correction curve creation apparatus according to the present invention.

FIG. 6 is a functional block diagram of the gradation correction curve creation apparatus 400 which is an embodiment of the gradation correction curve creation apparatus according to the present invention, where the gradation correction curve creation program 300 is installed on the personal computer 20 shown in FIGS. 1 to 4 to make the personal computer 20 operate as the gradation correction curve creation apparatus 400.

The gradation correction curve creation apparatus 400 shown in FIG. 6 includes a first gradation correction curve creation section 410, second gradation correction curve creation section 420, start position calculation section 430, and gradation correction curve combining section 440. As the gradation correction curve creation program 300 shown in FIG. 5 is installed on the personal computer 20 shown in FIGS. 1 to 4, the first gradation correction curve creation section 310 of the gradation correction curve creation program 300 constitutes the first gradation correction curve creation section 410, second gradation correction curve creation section 320 constitutes the second gradation correction curve creation section 420, start position calculation section 330 constitutes the start position calculation section 430, and the gradation correction curve combining section 340 constitutes the gradation correction curve combining section 440.

A color chart 401 is composed of monochromatic patches which are density patches of plain colors C, M, Y, and K and gray patches which are density patches of gray consisting of a mixture of C, M, and Y. A method for creating the color chart 401 will be described in detail later. In the color chart 401, density values of individual monochromatic density patches are measured (hereinafter the density values of monochromatic patches will be referred to as the measured monochromatic values) and the measured monochromatic values are fed to the first gradation correction curve creation section 410. Also, in the color chart 401, L*a*b* calorimetric values of individual gray density patches are measured (hereinafter the L*a*b* calorimetric values of gray density patches will be referred to as measured gray values) and the measured gray values are fed to the second gradation correction curve creation section 420. Incidentally, the monochromatic patches here are an example of the monochromatic patches according to the present invention while the gray patches are an example of the gray patches according to the present invention. Also, the "density values" are an example of the "first physical quantity" according to the present invention, the "measured monochromatic values" obtained by measuring monochromatic patches are an example of the "first measured values" according to the present invention, the "calorimetric values" are an example of the "second physical quantity" according to the present invention, and the "measured gray values" obtained by measuring gray patches are an example of the "second measured values" according to the present invention.

The personal computer 20 prestores target density values for individual monochromatic density patches (hereinafter such target density values will be referred to as target monochromatic values) and target L*a*b* calorimetric values for gray density patches (hereinafter such target calorimetric values will be referred to as target gray values). The "target monochromatic values" here are an example of the "first target values" according to the present invention while the "target gray values" here are an example of the "second target values" according to the present invention.

The first gradation correction curve creation section 410 creates a first gradation correction curve based on the measured monochromatic values received and the target monochromatic values prestored. The first gradation correction curve creation section 410 is an example of the first gradation correction curve creation section of the gradation correction curve creation apparatus according to the present invention. The first gradation correction curve created is sent to the gradation correction curve combining section 440.

The second gradation correction curve creation section 420 creates a second gradation correction curve based on the measured gray values received and the target gray values. The second gradation correction curve creation section 420 is an example of the second gradation correction curve creation section of the gradation correction curve creation apparatus according to the present invention. The second gradation correction curve created is sent to the gradation correction curve combining section 440.

The start position calculation section 430 calculates start positions on the first gradation correction curve and second gradation correction curve at which the gray component in color mixture starts to be replaced with K in the UCR process performed by the UCR processor 60 shown in FIG. 2. The start position calculation section 430 is an example of the start position calculation section of the gradation correction curve creation apparatus according to the present invention. The calculated start positions are sent to the gradation correction curve combining section 440.

The gradation correction curve combining section 440 receives the start positions from the start position calculation section 430, the first gradation correction curve from the first gradation correction curve creation section 410, and the second gradation correction curve from the second gradation correction curve creation section 420. The gradation correction curve combining section combines the more shadowed side of the first gradation correction curve than the start position and the more highlighted side of the second gradation correction curve than the start position, and thereby creates a continuous third gradation correction curve. The third gradation correction curve created is used as the gradation correction curve 51 by the gradation correction apparatus 50 shown in FIG. 2. The gradation correction curve combining section 440 is an example of the gradation correction curve combining section of the gradation correction curve creation apparatus according to the present invention.

Basically, the gradation correction curve creation apparatus 400 is configured as described above.

Figure 7:
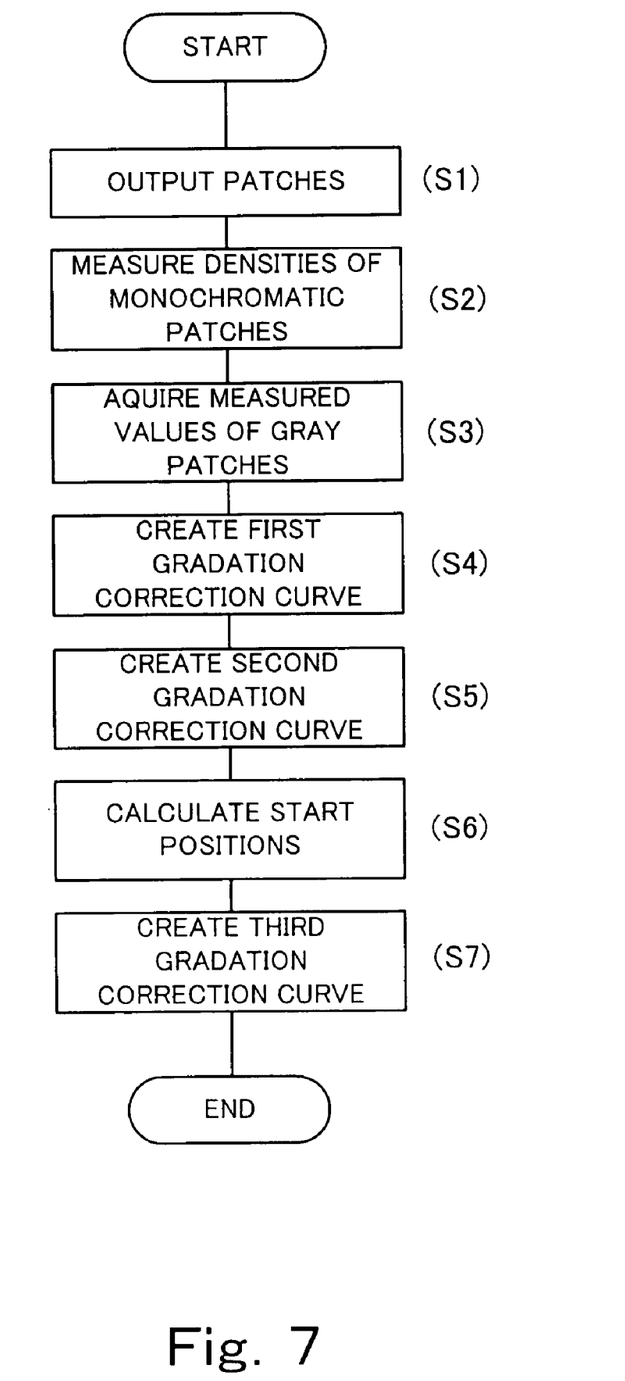
FIG. 7 is a flowchart showing procedures for creating a third gradation correction curve.

FIG. 7 is a flowchart showing procedures for creating the third gradation correction curve shown in FIG. 6. Now, based on this flowchart, detailed description will be given of a sequence of processes for creating a third gradation correction curve using an embodiment of the gradation correction curve creation method according to the present invention.

First, the personal computer 20 sends image data for density patches of individual plain colors C, M, and Y as well as image data for density patches of a combination of the plain colors C, M, and Y to the color printer 30 shown in FIG. 1. Based on the image data received, the color printer 30 creates the color chart 401, shown in FIG. 6, consisting of monochromatic patches and gray patches (step S1 in FIG. 7). According to this embodiment, monochromatic patches of K are created in addition to the monochromatic patches of the individual plain colors C, M, and Y.

Figure 8:
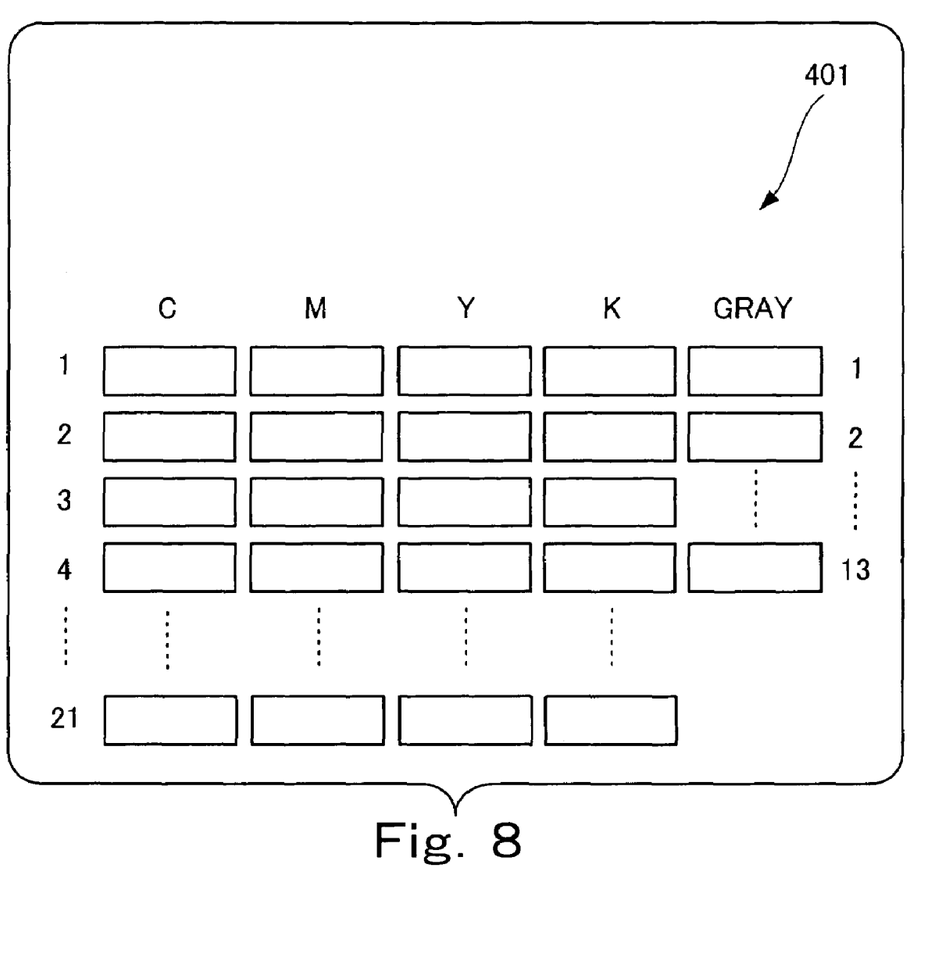
FIG. 8 is a diagram showing a color chart.

FIG. 8 is a diagram showing the color chart 401 created on the color printer 30 and shown also in FIG. 6.

The color chart 401 contains 21 monochromatic density patches each of plain colors C, M, Y, and K as well as 13 gray density patches consisting of a mixture of C, M, and Y.

The operation of creating the color chart 401 in step S1 is an example of the patch output step of the gradation correction curve creation method according to the present invention.

In the color chart 401 shown in FIG. 8, the densities of the monochromatic density patches are measured (step S2 in FIG. 7). The measurements themselves are undertaken apart from the gradation correction curve creation apparatus 400 shown in FIG. 6 by the operator using, for example, a calorimeter or the like with a density measurement mode. After acquiring measured monochromatic values which are the densities of monochromatic patches, the operator enters them in the personal computer 20 using the keyboard 23 or the like shown in FIG. 3. The measured monochromatic values are fed to the first gradation correction curve creation section 410 shown in FIG. 6. The operation of acquiring measured monochromatic values in step S2 is an example of the first measuring step of the gradation correction curve creation method according to the present invention.

Then, in the color chart 401 shown in FIG. 8, the L*a*b* calorimetric values of the gray density patches are measured (step S3 in FIG. 7). Again, the measurements themselves are undertaken by the operator using a calorimeter or the like, as is the case with step S2. After the operator acquires measured gray values which are the L*a*b* calorimetric values of the gray patches and enters them in the personal computer 20, the measured gray values are fed to the second gradation correction curve creation section 420 shown in FIG. 6. The operation of acquiring measured gray values in step S3 is an example of the second measuring step of the gradation correction curve creation method according to the present invention.

Incidentally, when feeding measured monochromatic values to the first gradation correction curve creation section 410 in step S2, and the measured gray values to the second gradation correction curve creation section 420 in step S3, the measured values may be fed directly from the calorimeter or the like to the personal computer 20 (i.e., to the first gradation correction curve creation section 410 and the second gradation correction curve creation section 420) if the calorimeter or the like is equipped with capabilities to output measured data directly as signals and is connected to the personal computer 20 via a signal cable.

The operations of steps 1 to 3 described above are preparatory operations for creation of gradation correction curves and are carried out by the color printer 30 and operator rather than the gradation correction curve creation apparatus 400 shown in FIG. 6.

Figure 9:
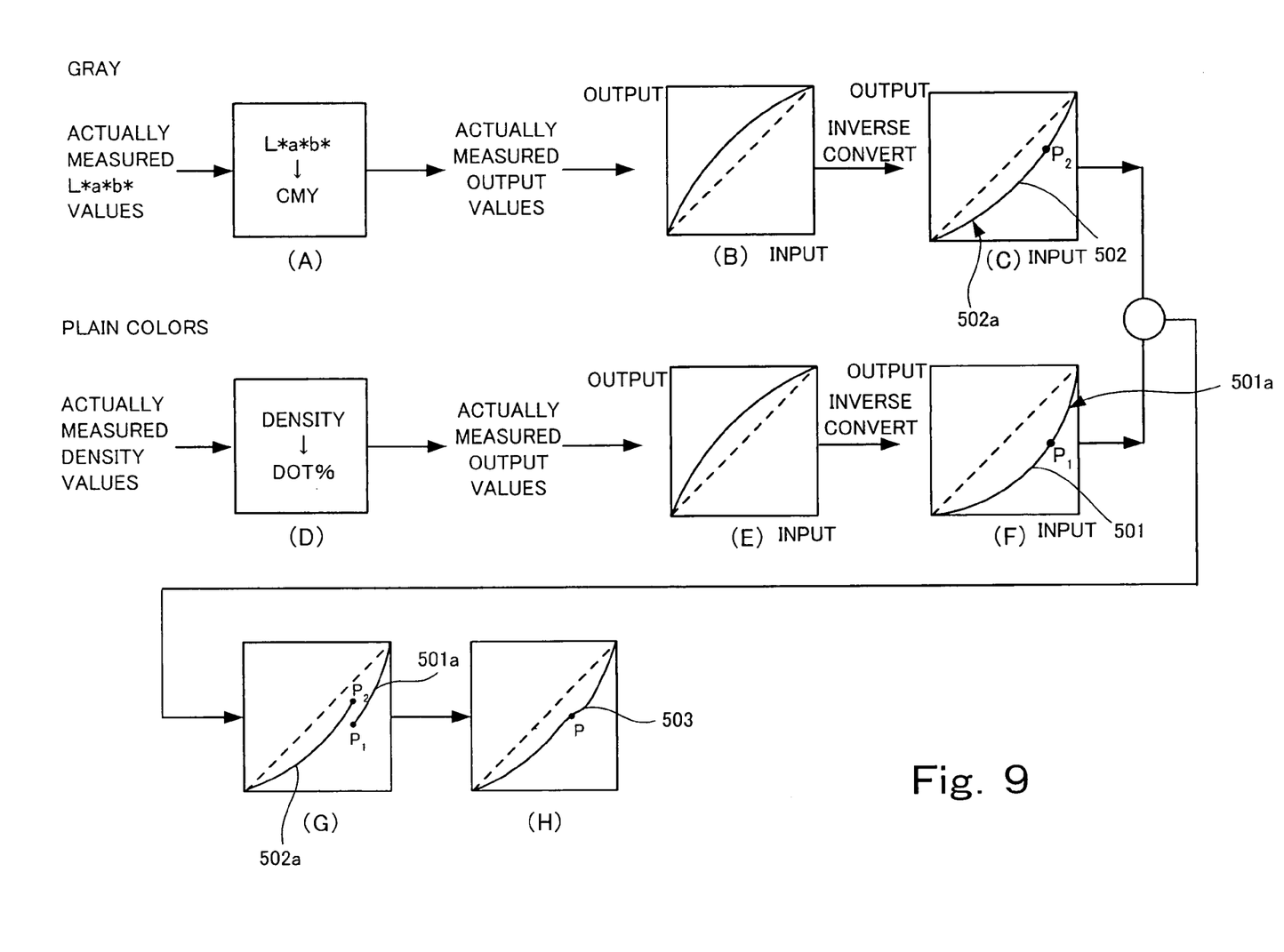
FIG. 9 is a schematic diagram showing the processes of step S4 and subsequent steps in the flowchart of FIG. 7.

FIG. 9 is a schematic diagram showing the processes of step S4 and subsequent steps, carried out in the gradation correction curve creation apparatus 400, in the flowchart of FIG. 7. The process of creating gradation correction curves carried out in the gradation correction curve creation apparatus 400 will be described below with reference to FIG. 9 as well as FIG. 7.

When measured monochromatic values are received, the first gradation correction curve creation section 410 shown in FIG. 6 creates a first gradation correction curve based on prestored target monochromatic values (target density values of individual monochromatic density patches) as well as on the measured monochromatic values (step S4 in FIG. 7). Gradation correction curve for K can also be created in step S4, as is the case with C, M, and Y. However, regarding K, because of the absence of information from gray patches, there is no need to perform the processes of step S5 and subsequent steps and the gradation correction curve creation method according to the present invention is not used for K. Thus, only the three colors C, M, and Y will be described below, omitting description of K. First, as shown in (D) of FIG. 9, actually measured density values of C, M, and Y are converted into actually measured output values which represent dot percentages of C, M, and Y. According to this embodiment, actually measured density values correspond to measured monochromatic values. To convert actually measured density values into actually measured output values which represent dot percentages, the Murray-Davis equation shown below is used.

[Formula 1]

$$\text{Dot } \% = \frac{1 - 10^{-D_R}}{1 - 10^{-D_V}} \times 100\% \quad (1)$$

where $D_R$ is the actually measured density value to be converted into a dot percentage and $D_V$ is a solid density value.

Regarding the color printer 30 shown in FIG. 1, even printers of the same model differ slightly from one to another in characteristics. Thus, even when printing out images with the same gradation characteristics, each printer requires slightly different gradation correction curves. Here, however, ignoring differences among individual printers a gradation correction curve has been prepared for a standard printer of the same model as the color printer 30 (this gradation correction curve is referred to as a standard gradation correction curve) and stored in the personal computer 20. According to this embodiment, target monochromatic values and target gray values such as those described above are calculated using the standard gradation correction curve.

The horizontal axis (input) in (E) of FIG. 9 represents data which has undergone gradation correction (input data of the color printer 30) based on the standard gradation correction curve and which corresponds to the target monochromatic value described above. The vertical axis (output) in (E) of FIG. 9 represents the actually measured output value which represents the dot percentage calculated based on Formula 1. Only a single graph for a single color is shown in (E) of FIG. 9 to represent the three colors C, M, and Y.

If the color printer 30 shown in FIG. 1 has standard characteristics, the input and output in (E) of FIG. 9 should have a linear relationship as indicated by the dotted line in (E) of FIG. 9. Actually, however, the color printer 30 shown in FIG. 1 has characteristics which more or less deviate from the standard characteristics and its input-output relationship also deviates from a linear relationship, as indicated by the solid line in (E) of FIG. 9.

Thus, a curve which has a relationship opposite to that shown in (E) of FIG. 9 is created as shown in (F) of FIG. 9. The data (input data) which has undergone gradation correction based on the standard gradation correction curve is further converted according to the curve 501 indicated by the solid line in (F) of FIG. 9 and outputted to the color printer 30. Then, as indicated by the dotted line in (F) of FIG. 9, the color printer 30 outputs an image which has a linear relationship with the data (input data) which has undergone gradation correction based only on the standard gradation correction curve. The curve 501 corresponds to the first gradation correction curve described above. It is an example of the first gradation correction curve according to the present invention. The operation of creating the first gradation correction curve in step S4 is an example of the first gradation correction curve creation step of the gradation correction curve creation method according to the present invention. The first gradation correction curve created is sent to the gradation correction curve combining section 440 shown in FIG. 6.

Processes based on measurement results of monochromatic patches have been described so far, and similar processes can be performed based on measurement results of gray patches.

Upon receiving the measured gray values, the second gradation correction curve creation section 420 in FIG. 6 creates a second gradation correction curve based on prestored target gray values (target density values of individual gray density patches) as well as on the measured gray values (step S5 in FIG. 7). In this process, as shown in (A) of FIG. 9, actually measured L*a*b* values (the measured gray values) obtained by actual measurement are converted into actually measured output values which represent the colors C, M, and Y, based on a profile of the color printer 30 prepared in advance (the profile represents, for the color printer 30, correspondence between output data values of the CMY colors and resulting colors—L*a*b* values—on screen).

The horizontal axis (input) in (B) of FIG. 9 represents data to be output to the color printer 30 (input data of the color printer 30). The data has undergone gradation correction based on the standard gradation correction curve. It corresponds to the target gray value described above. The vertical axis (output) in (B) of FIG. 9 represents the actually measured output value obtained based on the profile of the color printer 30. Only a single graph for one color is shown in (B) of FIG. 9 to represent the three colors C, M, and Y. If the color printer 30 shown in FIG. 1 has the standard characteristics described above, the input and output in (B) of FIG. 9 should have a linear relationship as indicated by the dotted line in (B) of FIG. 9. Actually, however, the color printer 30 shown in FIG. 1 has characteristics which more or less deviate from the standard characteristics and its input-output relationship also deviates from a linear relationship, as indicated by the solid line in (B) of FIG. 9.

Thus, a curve which has a relationship opposite to that shown in (B) of FIG. 9 is created as shown in (C) of FIG. 9. The data (input data) which has undergone gradation correction based on the standard gradation correction curve is further converted according to the curve 502 indicated by the solid line in (C) of FIG. 9 and outputted to the color printer 30. Then, as indicated by the dotted line in (C) of FIG. 9, the color printer 30 outputs an image which has a linear relationship, in terms of color, with the data (input data) which has undergone gradation correction based only on the standard gradation correction curve.

The curve 502 corresponds to the second gradation correction curve described above. It is an example of the second gradation correction curve according to the present invention. The operation of creating the second gradation correction curve in step S5 is an example of the second gradation correction curve creation step of the gradation correction curve creation method according to the present invention. The second gradation correction curve created is sent to the gradation correction curve combining section 440 shown in FIG. 6.

Upon receiving the first gradation correction curve created using the monochromatic patches and second gradation correction curve created using the gray patches, the gradation correction curve combining section 440 transfers them to the start position calculation section 430.

Upon receiving the first gradation correction curve and second gradation correction curve from the gradation correction curve combining section 440, by using the UCR function 61 shown in FIG. 2, the start position calculation section 430 calculates the start positions on the first gradation correction curve and second gradation correction curve at which the gray component in color mixture starts to be replaced with K in the UCR process performed by the UCR processor 60 (step S6 in FIG. 7). In this example, it is assumed that the start position on the first gradation correction curve has been calculated to be the start position $P_1$ in (F) of FIG. 9 and that the start position on the second gradation correction curve has been calculated to be the start position $P_2$ in (C) of FIG. 9. The operation of calculating the start positions on the first gradation correction curve and second gradation correction curve in step S6 is an example of the start position calculation step of the gradation correction curve creation method according to the present invention. The calculated start positions are sent to the gradation correction curve combining section 440 in FIG. 6.

Upon receiving the start positions from the start position calculation section 430, the gradation correction curve combining section 440 combines the first gradation correction curve and second gradation correction curve into a third gradation correction curve (step S7 in FIG. 7). First, the gradation correction curve combining section 440 extracts the more shadowed side 501a of the first gradation correction curve (curve 501) in (F) of FIG. 9 than the start position $P_1$. Similarly, it extracts the more highlighted side 502a of the second gradation correction curve (curve 502) in (C) of FIG. 9 than the start position $P_2$. Then, as shown in (G) of FIG. 9, the gradation correction curve combining section 440 lays out the shadowed side 501a of the first gradation correction curve and highlighted side 502a of the second gradation correction curve. Then, it combines them into a continuous single curve 503 shown in (H) of FIG. 9. A concrete method for creating the curve 503 will be described below.

Figure 10:
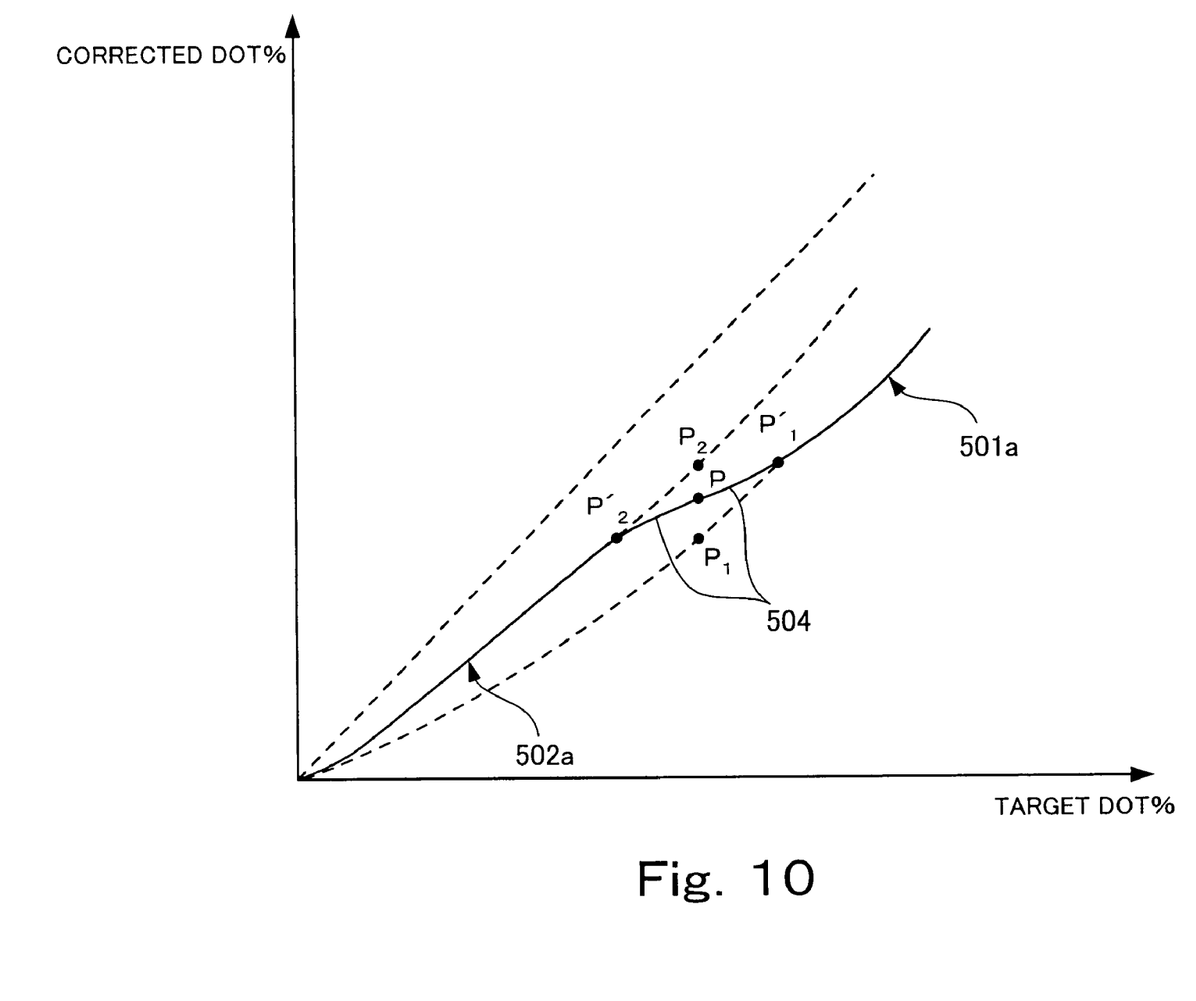
FIG. 10 is a diagram showing a method for creating the curve shown in (H) of FIG. 9.

FIG. 10 is a diagram showing a method for creating the curve 503 shown in (H) of FIG. 9.

According to this embodiment, the gradation correction curve combining section 440 finds the midpoint P of a straight line connecting the start position $P_1$ on the first gradation correction curve and the start position $P_2$ on the second gradation correction curve. Then, it creates an interpolation curve 504 passing through a position $P_1'$ on the more shadowed side than the start position $P_1$, the midpoint P, and a position $P_2'$ on the more highlighted side than the start position $P_2$ and connecting smoothly to the first gradation correction curve and second gradation correction curve. Connecting the position $P_1'$ on the first gradation correction curve, interpolation curve 504, and the position $P_2'$ on the second gradation correction curve results in the continuous curve 503 shown in (H) of FIG. 9 combining the part of the first gradation correction curve on the more shadowed side than the start position $P_1$ and the part of the second gradation correction curve on the more highlighted side than the start position $P_2$. The curve 503 is the third gradation correction curve described above and is an example of the third gradation correction curve according to the present invention. The operation of creating the curve 503 in step S7 is an example of the gradation correction curve combining step of the gradation correction curve creation method according to the present invention. Incidentally, although according to this embodiment, the interpolation curve 504 passes through the position $P_1'$, midpoint P, and position $P_2'$, another interpolation curve may be used as long as it smoothly connects the shadowed side 501a of the first gradation correction curve and highlighted side 502a of the second gradation correction curve near the start position $P_1$ and start position $P_2$. Also, the interpolation curve may be a straight line joining two points, cubic curve, or another desired curve.

The third gradation correction curve created by the gradation correction curve combining section 440 in FIG. 6 and shown as the curve 503 in (H) of FIG. 9 is used as the gradation correction curve 51 by the gradation correction apparatus 50 shown in FIG. 2. The gradation correction apparatus 50 performs a gradation correction process on image data based on the gradation correction curve 51. The image data subjected to the gradation correction process is then subjected to a UCR process by the UCR processor 60. Consequently, the gray component of color mixture in the image produced from the image data is replaced by K. The gradation correction curve 51 created by the gradation correction curve creation apparatus according to this embodiment follows the gradation correction curve of the gray made of a color mixture until replacement with K begins in the UCR process, and follows the gradation correction curve of plain colors after the replacement with K begins. Thus, this embodiment is applicable even when a UCR process is carried out and can improve the reproducibility of colors especially on the shadowed side where most of the gray component is replaced by K.

Incidentally, although density has been cited above as an example of the "color-related first physical quantity" according to the present invention, alternatively the "color-related first physical quantity" according to the present invention may be calorimetric values.

Also, although calorimetric values have been cited above as an example of the "color-related second physical quantity" according to the present invention, alternatively the "color-related second physical quantity" according to the present invention may be density.

Furthermore, although actually measured density values of C, M, and Y are used as the first measured values of monochromatic patches according to the present invention and measured values obtained by actual measurement of gray patches are used as the second measured values of the gray patches according to the present invention, the first measured values and second measured values according to the present invention are not limited to the measured values described above and any measured values obtained by measuring color-related physical quantities may be used alternatively.

What is claimed is:

1. A gradation correction curve creation method for creating gradation correction curves which define gradation correction of an image, comprising:

a patch output step of outputting, from an image output device, a plurality of monochromatic patches which are of a predetermined plain color and differ from one another in density and a plurality of gray patches which are of gray consisting of a mixture of plain colors and differ from one another in density;

a first measuring step of measuring a color-related first physical quantity of the plurality of monochromatic patches outputted from the patch output step and obtaining first measured values;

a second measuring step of measuring a color-related second physical quantity of the plurality of gray patches outputted from the patch output step and obtaining second measured values;

a first gradation correction curve creation step of creating a first gradation correction curve based on the first measured values obtained in the first measuring step and on first target values which represent color targets for the monochromatic patches;

a second gradation correction curve creation step of creating a second gradation correction curve based on the second measured values obtained in the second measuring step and on second target values which represent color targets for the gray patches;

a start position calculation step of calculating positions on the first and second gradation correction curves at which a gray component in a color mixture of plain colors starts to be replaced with monochrome black through an under-color removal process; and a gradation correction curve combining step of combining the more shadowed side of the first gradation correction curve created in the first gradation correction curve creation step than the position calculated in the start position calculation step and the more highlighted side of the second gradation correction curve created in the second gradation correction curve creation step than the position calculated in the start position calculation step, and thereby creating a continuous third gradation correction curve.

2. The gradation correction curve creation method according to claim 1, wherein the first physical quantity is density and second physical quantity is calorimetric values.

3. A gradation correction curve creation apparatus that creates a gradation correction curve which defines gradation correction of an image, comprising:

a first gradation correction curve creation section which creates a first gradation correction curve based on first measured values obtained by measuring a color-related first physical quantity of a plurality of monochromatic patches which are of a predetermined plain color and differ from one another in density as well as on first target values which represent color targets for the monochromatic patches, the plurality of monochromatic patches having been output from an image output device;

a second gradation correction curve creation section which creates a second gradation correction curve based on second measured values obtained by measuring a color-related second physical quantity of a plurality of gray patches which are of gray consisting of a mixture of plain colors and differ from one another in density as well as on second target values which represent color targets for the gray patches, the plurality of gray patches having been output from the image output device;

a start position calculation section which calculates positions on the first and second gradation correction curves at which a gray component in a color mixture of plain colors starts to be replaced with monochrome black through an under-color removal process; and a gradation correction curve combining section which combines the more shadowed side of the first gradation correction curve created by the first gradation correction curve creation section than the position calculated by the start position calculation section and the more highlighted side of the second gradation correction curve created by the second gradation correction curve creation section than the position calculated by the start position calculation section, and thereby creates a continuous third gradation correction curve.

4. A gradation correction curve creation program storage medium containing a gradation correction curve creation program that runs on a computer and makes the computer create gradation correction curves which define gradation correction of an image, wherein the gradation correction curve creation program comprises:

a first gradation correction curve creation section which creates a first gradation correction curve based on first measured values obtained by measuring a color-related first physical quantity of a plurality of monochromatic patches which are of a predetermined plain color and differ from one another in density as well as on first target values which represent color targets for the monochromatic patches, the plurality of monochromatic patches having been output from an image output device;

a second gradation correction curve creation section which creates a second gradation correction curve based on second measured values obtained by measuring a color-related second physical quantity of a plurality of gray patches which are of gray consisting of a mixture of plain colors and differ from one another in density as well as on second target values which represent color targets for the gray patches, the plurality of gray patches having been output from the image output device;

a start position calculation section which calculates positions on the first and second gradation correction curves at which a gray component in a color mixture of plain colors starts to be replaced with monochrome black through an under-color removal process; and a gradation correction curve combining section which combines the more shadowed side of the first gradation correction curve created by the first gradation correction curve creation section than the position calculated by the start position calculation section and the more highlighted side of the second gradation correction curve created by the second gradation correction curve creation section than the position calculated by the start position calculation section, and thereby creates a continuous third gradation correction curve.

* * * * *